US011412384B1

(12) United States Patent
Southern et al.

(10) Patent No.: US 11,412,384 B1
(45) Date of Patent: Aug. 9, 2022

(54) INCIDENT DETECTION AND RESPONSE USING WIRELESS ACCESS POINT DATA

(71) Applicant: Rapid7, Inc., Boston, MA (US)

(72) Inventors: John Robert Southern, Toronto (CA);
Jack Matthew Heysel, Toronto (CA);
Tyler Stiller, Lovettsville, MA (US);
Kasra Asadzadeh, Toronto (CA);
Sharon Katz, Toronto (CA)

(73) Assignee: Rapid7, Inc., Boston, MA (US)

( * ) Notice: Subject to any disclaimer, the term of this patent is extended or adjusted under 35 U.S.C. 154(b) by 195 days.

(21) Appl. No.: 16/591,741

(22) Filed: Oct. 3, 2019

(51) Int. Cl.
*H04W 12/63* (2021.01)
*H04W 12/122* (2021.01)
*H04W 64/00* (2009.01)
*H04W 88/08* (2009.01)

(52) U.S. Cl.
CPC ......... *H04W 12/122* (2021.01); *H04W 12/63* (2021.01); *H04W 64/003* (2013.01); *H04W 88/08* (2013.01)

(58) Field of Classification Search
CPC ... H04W 88/08; H04W 64/003; H04W 12/63; H04W 12/122
USPC ......................................................... 726/23
See application file for complete search history.

(56) References Cited

U.S. PATENT DOCUMENTS

| | | | |
|---|---|---|---|
| 7,808,958 B1* | 10/2010 | Hernacki | H04W 12/12 370/338 |
| 9,781,698 B2* | 10/2017 | Venkatraman | G01S 5/0252 |
| 10,505,967 B1* | 12/2019 | Schwartz | G06F 21/554 |
| 2004/0209617 A1* | 10/2004 | Hrastar | H04W 24/00 455/434 |
| 2005/0128989 A1* | 6/2005 | Bhagwat | H04K 3/65 370/338 |
| 2006/0193284 A1* | 8/2006 | Stieglitz | H04L 63/0492 370/328 |
| 2009/0280827 A1* | 11/2009 | Michaud | H04L 65/1013 455/456.1 |
| 2013/0073746 A1* | 3/2013 | Singh | H04W 52/0235 709/248 |
| 2013/0094489 A1* | 4/2013 | Diamant | H04W 12/02 370/338 |
| 2014/0104291 A1* | 4/2014 | Rutz | H04W 24/04 345/589 |
| 2018/0083848 A1* | 3/2018 | Siddiqi | H04L 41/22 |
| 2018/0139719 A1* | 5/2018 | Deshpande | H04W 4/023 |

\* cited by examiner

*Primary Examiner* — Josnel Jeudy
(74) *Attorney, Agent, or Firm* — Ashwin Anand

(57) ABSTRACT

Disclosed herein are methods, systems, and processes to detect rogue wireless access points and determine their approximate location in a geospatial location. Wireless access point data collected from wireless access points by fixed sensor nodes and agent-based sensor nodes in a geospatial location is received. A wireless site survey is performed at the geospatial location based on the wireless access point data. Based on the wireless site survey, an approximate location of a rogue wireless access point at the geospatial location is determined.

18 Claims, 11 Drawing Sheets

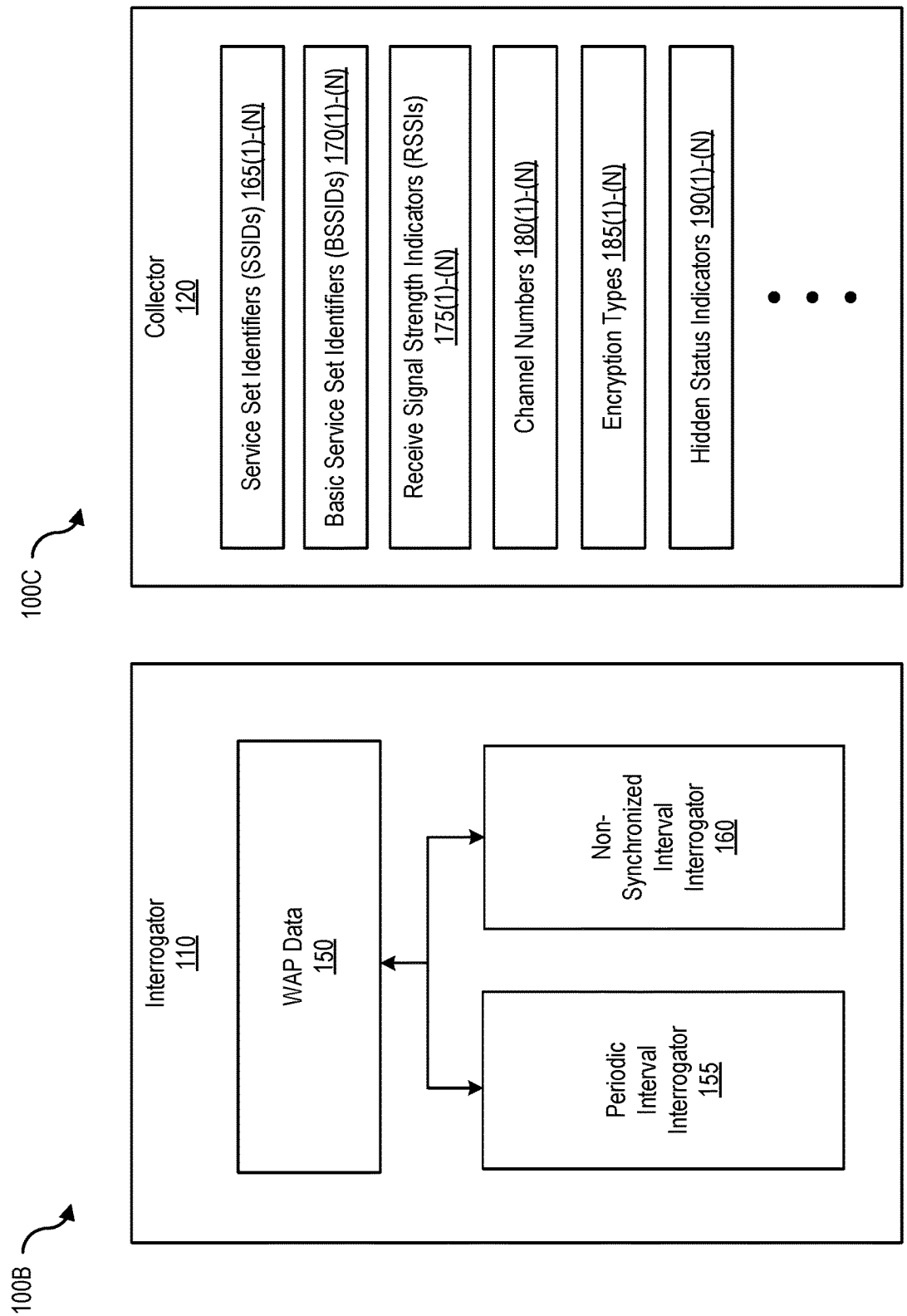

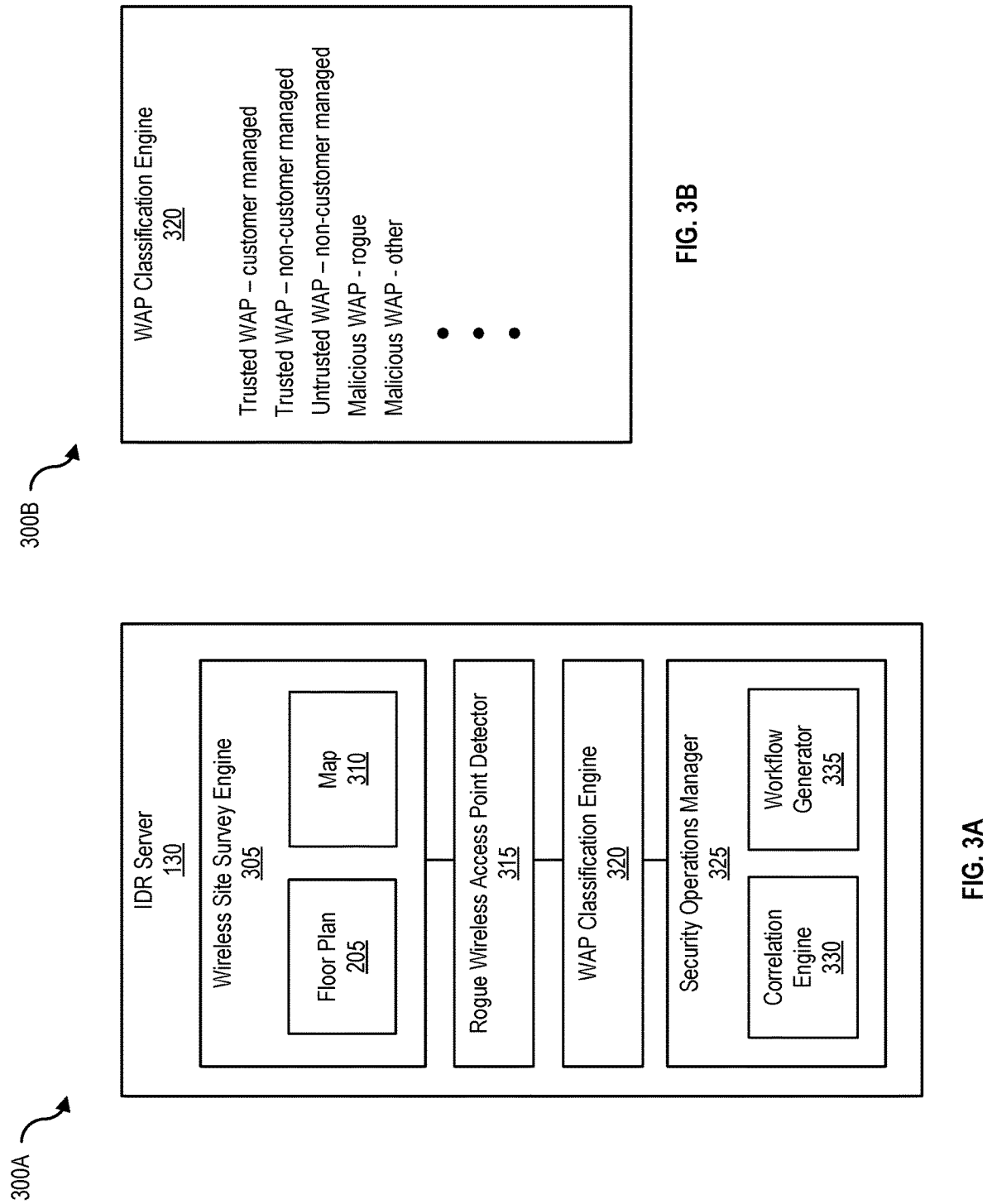

US 11,412,384 B1

INCIDENT DETECTION AND RESPONSE USING WIRELESS ACCESS POINT DATA

BACKGROUND

Field of the Disclosure

This disclosure is related to cybersecurity computing systems. In particular, this disclosure is related to facilitating and performing incident detection and response (IDR) using wireless access point (WAP) data.

Description of the Related Art

Incident detection and response (IDR) (also known as attack/threat detection) refers to the process of identifying intruders in computing environments and infrastructure, retracing their activity, containing the threat, and removing their foothold. For example, network devices required for facilitating Internet connectivity in office buildings and other geospatial locations can be co-opted by malicious actors such as hackers to gain access to corporate wireless networks and perform malevolent actions such as exfiltrating data or causing other harm.

One example of a network device that poses a security risk from an IDR perspective is a wireless access point (WAP). A WAP is a networking hardware device that permits other Wi-Fi devices to connect to a wired network. The WAP typically connects to a router (e.g., via a wired network) as a standalone device, but can also be an integral component of the router.

If WAPs are connected to a network, anybody within range of the WAP (which typically extends farther than the intended area) can attach to the network. Unfortunately, a rogue or decoy WAP can be physically placed (or hidden) in a geospatial location (e.g., inside an office building) by a malicious actor. Such a rogue or decoy WAP can be configured to spoof the identity of a legitimate WAP in the same network, thereby deceiving network users to inadvertently connect to the network via the rogue or decoy WAP.

SUMMARY OF THE DISCLOSURE

Disclosed herein are methods, systems, and processes for performing incident detection and response (IDR) using wireless access point (WAP) data. One such method involves receiving WAP data associated with wireless access points from fixed sensor nodes and agent-based sensor nodes, performing a wireless site survey at a geospatial location based on the WAP data, and based on the wireless site survey, determining an approximate location at the geospatial location, of a rogue wireless access point that is one of the wireless access points.

In certain embodiments, the fixed sensors nodes provide a part of the WAP data at a periodic interval and the agent-based sensor nodes provide another part of the WAP data at a non-synchronized interval. In one embodiment, for each wireless access point, the WAP data includes a Service Set Identifier (SSID), a Basic Service Set Identifier (BSSID), a Receive Signal Strength Indicator (RSSI), a channel number, an encryption type, and a hidden status.

In some embodiments, performing the wireless site survey includes accessing a floor plan for the geospatial location and mapping the RSSI for a wireless access point as indicated by the fixed and the agent-based sensor nodes. In other embodiments, determining the approximate location of the rogue WAP includes accessing a set of trusted WAPs and identifying a WAP that shares an SSID but not a BSSID with the trusted WAPs.

In certain embodiments, the method involves designating the WAP as the rogue WAP and indicating the approximate location of the rogue WAP on the floor plan. In one embodiment, the method involves classifying the each WAP into a trusted class for customer managed WAPs, a trusted class for non-customer managed WAPs, an untrusted class for non-customer managed WAPs, a malicious class for the WAP, and a malicious class for all other WAPs.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

This disclosure may be better understood, and its objects, features, and advantages made apparent to those skilled in the art by referencing these drawings and/or figures.

FIG. 1B is a block diagram 100B of an interrogator, according to one embodiment of the present disclosure.

FIG. 1C is a block diagram 100C of a collector, according to one embodiment of the present disclosure.

FIG. 3A is a block diagram 300A of an incident detection and response (IDR) server, according to one embodiment of the present disclosure.

FIG. 3B is a block diagram 300B of a WAP classification engine, according to one embodiment of the present disclosure.

Figure 1A:
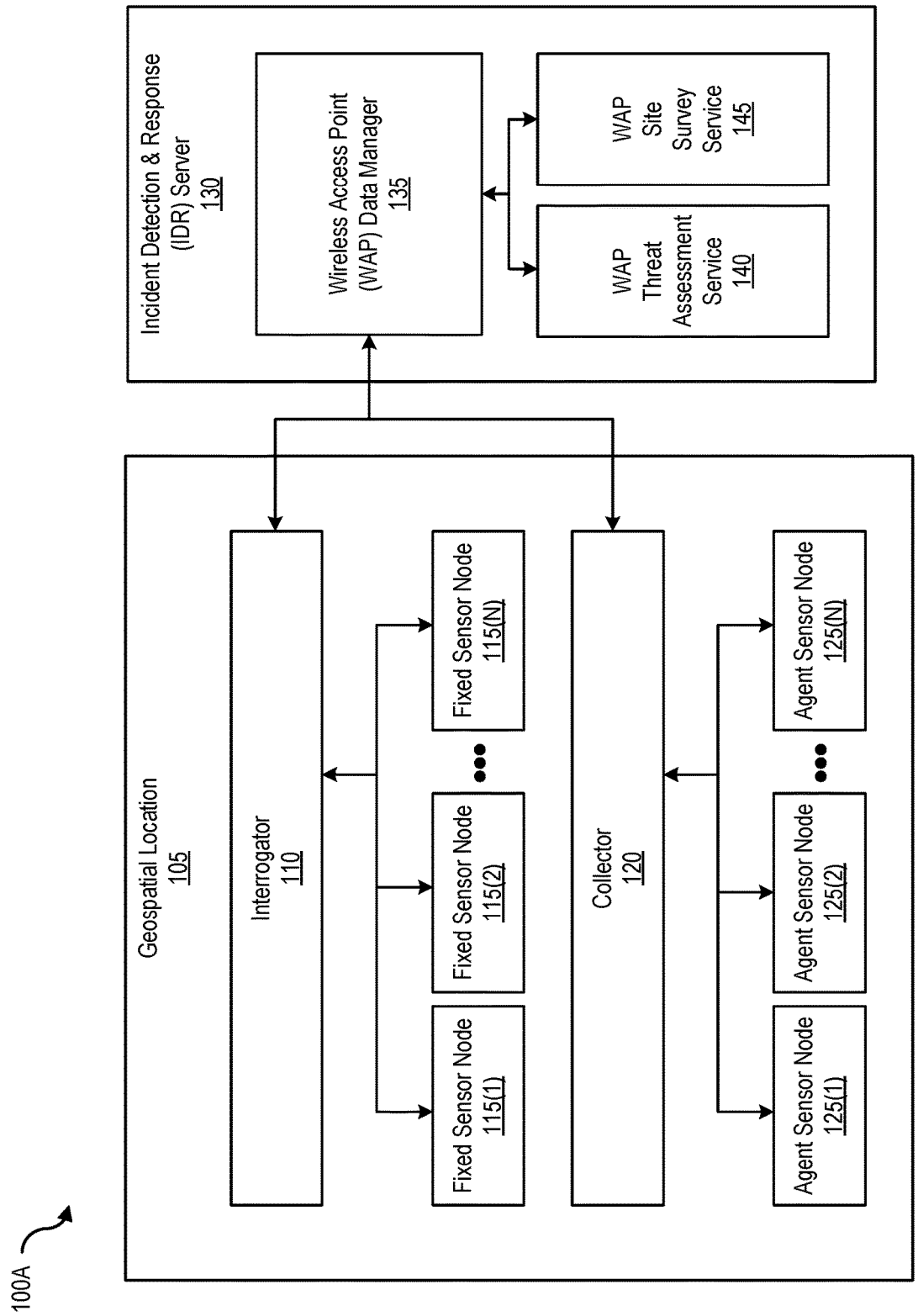
FIG. 1A is a block diagram 100A of a rogue wireless access point (WAP) detection and location identification system, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

A wireless access point (WAP) (or more generally just access point (AP)) is a physical networking hardware device that permits other Wi-Fi devices (e.g., computers, laptops, tablets, and the like) to connect to a wired network (e.g., a Local Area Network (LAN)). For example, a WAP typically connects to a router (or can be part of a router), which in turn provides Internet (and Wi-Fi) connectivity to the connecting devices. A WAP connects directly to a wired LAN (e.g., Ethernet) and then provides wireless connections using wireless LAN technology (e.g., Wi-Fi) for other devices to use the given wired connection. In this manner, WAPs support the connection of multiple wireless devices through a single wired connection.

As noted, if WAPs are connected to a network, anybody within range of the WAP (which typically extends farther than the intended area) can attach to the network. Unfortunately, a rogue or decoy WAP can be physically placed (or hidden) in a geospatial location (e.g., inside an office building) by a malicious actor. Such a rogue or decoy WAP can be configured to spoof the identity of a legitimate WAP in the same network, thereby deceiving network users to inadvertently connect to the network via the rogue or decoy WAP.

One example of a rogue WAP is the WiFi Pineapple, which is a decoy WAP that is cheaply available on the Internet. Although intended for penetration testing and ethical hacking, the WiFi Pineapple and similar decoy WAPs can be used for malicious purposes. Because such devices have multiple radios (rather than just a single radio found in most routers), they can interface with hundreds of devices at any given time (rather than just a few dozen) and also include custom interfaces configured to optimize and execute complicated network attacks.

A WiFi Pineapple can be used to perform a Wall of Sheep exploit. A Wall of Sheep is a running list of devices that have connected to an insecure network thus exposing their device identifiers (IDs), websites accessed, and relevant credentials. Once a Wall of Sheep module (called 'DWall') is installed on a WiFi Pineapple, any device that connects to it broadcasts its browsing traffic to the owner of the WiFi Pineapple. One exception to this rule is if a would-be victim is using a Virtual Private Network (VPN) to encrypt their web traffic or only visiting pages secured by Secure Hypertext Transfer Protocol (HTTPS).

HTTPS is a protocol that encrypts data being routed between a website server and a user device effectively preventing eavesdroppers from seeing the websites being visited. HTTPS also helps protect a user's web habits from an internet service provider (ISP), who can only see the top level domain habits of its user(s). However, although over half the Web has switched to HTTPS from its insecure predecessor HTTP, as many as 80% of the top 100 websites do not deploy HTTPS by default. This means that anyone who inadvertently connects to a WiFi Pineapple and then browses to an HTTP version of the website runs the risk of exposing their activity on that site (e.g., pages visited, search terms, and the like) to the person wielding the WiFi Pineapple.

A WiFi Pineapple can also be used to execute a Man-In-The-Middle (MITM) attack. MITM attacks involve eavesdropping on a user by inserting a WiFi Pineapple between the user's device (e.g., a laptop) and a legitimate WAP (e.g., a WAP provisioned by the user's company in the company's office building). In this example, the WiFi Pineapple can pretend to be the legitimate WAP so that it can snoop on information as it relays data from the user device to the decoy access point (e.g., by using a native feature on the WiFi Pineapple that scans for Service Set Identifiers (SSIDs)—the names of Wi-Fi networks that are being broadcast from devices in its vicinity, which as noted, can be quite expansive). WiFi Pineapples scan for SSIDs being broadcast by physical computing devices in their vicinity (e.g., inside an office building or other geospatial location). The WiFi Pineapples then rebroadcast these SSIDs so that they can trick the physical computing devices into thinking they have a (legitimate) access point that has been connected to in the past (e.g., a network called "Office WiFi").

What's more, a WiFi Pineapple can also be used to create an "Evil Portal" that generates fake versions of websites to capture usernames, passwords, and other sensitive credentials (e.g., by creating a local server on the attacker's computer to host a web page that looks like a regular login page for a well trafficked or popular service). Consequently, any devices that are connected to the WiFi Pineapple and try to browse a website will be redirected to the fake webpage being served by the attacker's computer. In addition, modules built for decoy WAPs like the WiFi Pineapple can block force HTTPS encryption and read/exfiltrate data (e.g., using a SSLsplit module to monitor HTTP requests from a user device when it is connected to a WiFi Pineapple). Therefore, rogue WAPs pose a grave security risk to modern corporations and enterprises and can cause irreparable harm from a cybersecurity standpoint.

Disclosed herein are methods, systems, and processes to perform incident detection and response (IDR) using wireless access point data by identifying and locating rogue WAPs (e.g., for deactivation and/or removal) in modern networked computing environments.

Example Rogue Wireless Access Point Detection and Location Identification System FIG. 1A is a block diagram 100A of a rogue wireless access point (WAP) detection and location identification system, according to one embodiment. Geospatial location 105 (e.g., an office building or a portion of an office building or other physical location) includes at least an interrogator 110, one or more fixed sensor nodes 115(1)-(N), a collector 120, and one or more agent sensor nodes 125(1)-(N). Interrogator 110, collector 120, fixed sensor nodes 115(1)-(N), and agent sensor nodes 125(1)-(N) in geospatial location 110 are communicatively coupled with an incident detection and response (IDR) server 130 (e.g., via a Local Area Network (LAN), Wide Area Network (WAN), Storage Area Network (SAN), or any other type of interconnection).

IDR server 130 includes at least a wireless access point (WAP) data manager 135, which is communicatively coupled to at least a WAP threat assessment service 140 and a WAP site survey service 145. In one embodiment, WAP data manager 135 receives, processes and manages wireless access point data received from interrogator 110 and/or collector 120. For example, WAP data manager 135 can combine or amalgamate WAP data received from fixed sensor nodes 115(1)-(N) (e.g., from scanning by interrogator 110) and collected from agent sensor nodes 125(1)-(N) (e.g., by collector 120).

In some embodiments, WAP threat assessment service 140 assesses security risks posed (or presented) by rogue or decoy WAPs that may maliciously target fixed sensor nodes 115(1)-(N) or agent sensor nodes 125(1)-(N) (e.g., Wall of Sheep exploits, MITM attacks, and the like). For example, WAP threat assessment service 140 can generate a security alert or notification that includes the identity and an approximate location in geospatial location 105 of a rogue WAP (e.g., a WAP masquerading as a legitimate WAP in the NW corner of geospatial location 105 is in fact a rogue, decoy, or illegitimate WAP). In other embodiments, WAP site survey service 145 performs a wireless site survey operation to optimize the placement (and visualization) of access points in geospatial location 105 (e.g., adjusting the location of individual access points, improving effectiveness of coverage area, and the like).

In some embodiments, geospatial location 105 includes a distributed network of wireless sensor nodes for collection of data regarding WAPs that are visible to these wireless sensor nodes. For example, such wireless sensor nodes can include fixed sensor nodes 115(1)-(N) that are essentially "System(s) on a Chip" and are physically placed or installed in various locations in geospatial location 105, but can also include agent sensor nodes 125(1)-(N), which are agent-based wireless sensor nodes that are resident on (and part of) one or more host machines (e.g., user devices such as desktops, laptops, and the like) in geospatial location 105. In one embodiment, fixed sensor nodes 115(1)-(N) can include an Adafruit Feather HUZZAH ESP8266 microcontroller board with an onboard Wi-Fi module with the ESP8266 sensor node software implemented in C++using the Arduino IDE for compilation (or any other similar or comparable wireless sensor node). In this example, fixed sensor nodes 115(1)-(N) each expose a representational state transfer application programming interface (RESTful API).

In one embodiment, host devices (e.g., desktops, laptops, mobile devices, and the like) with an agent deployed (e.g., Insight Agent provided by Rapid7®, Inc. of Boston, Mass.) include a Wi-Fi interface to facilitate collection of additional WAP data (e.g., by collector 120 as shown in FIG. 1A) to augment what is collected by fixed sensor nodes 115(1)-(N). In this example, interrogator 110, which can be a central host computing device, ingests WAP data collected by fixed sensor nodes 115(1)-(N) and agent sensor nodes 125(1)-(N) and aggregates (or amalgamates) the (ingested) WAP data (e.g., to perform wireless site survey operations and rogue wireless access point detection operations).

Example Interrogator and Collector

FIG. 1B is a block diagram 100B of an interrogator, according to one embodiment. Interrogator 110 is a central host and communicates with sensor nodes (e.g., fixed sensor nodes 115(1)-(N)) and interrogates the sensor nodes at a periodic interval using periodic interval interrogator 155. Interrogator 110 aggregates collected data (e.g., WAP data 150 as shown in FIG. 1B) and stores WAP data 150 in a database (e.g., to generate a visualization of the surrounding Wi-Fi network landscape). In addition to a first part of WAP data 150 collected by fixed sensor nodes 115(1)-(N), non-synchronized interval interrogator 160 collects a second part of WAP data 150 from agent sensor nodes 125(1)-(N) (e.g., via their wireless network interfaces).

In some embodiments, the second part of WAP data 150 (e.g., data provided by agent-based sensor nodes and agents themselves) can further augment the volume as well as a spatial and temporal resolution of the collected WAP data 150. For example, spatial resolution is improved because agents (with agent sensor nodes 125(1)-(N)) are capable of moving around within geospatial location 105 (e.g., laptops, mobile devices, and the like) and filling in potential coverage gaps (e.g., which can be missed by fixed sensor nodes 115(1)-(N)). Therefore, this non-static (and thus non-synchronous) WAP data 150 provided by agent sensor nodes 125(1)-(N) combined with periodic WAP data 150 fixed sensor nodes 115(1)-(N) improves spatial resolution of the disclosed WAP detection and location identification system.

In other embodiments, temporal resolution is improved because agent-based sensor nodes (e.g., agent sensor nodes 125(1)-(N)) can significantly increase the number of wireless sensor nodes that are available to collect (and contribute to) WAP data 150. For example, the collection of (additional augmentable) parts of WAP data 150 at non-synchronized intervals by agent-based sensor node(s) permits an accurate determination of when a particular wireless access point becomes active or inactive.

FIG. 1C is a block diagram 100C of a collector, according to one embodiment of the present disclosure. Collector 120 collects, aggregates, augments, combines, processes, and manages WAP 150 collected from both fixed sensor nodes 115(1)-(N) and agent sensor nodes 125(1)-(N). As noted, wireless sensor nodes include a RESTful web service API to expose WAP data 150 for use by external applications to perform at least the following operations: (1) wireless site survey operations (e.g., for optimizing the performance of Wi-Fi networks) and (2) rogue access point detection operations to detect, locate, and remove rogue or illegitimate WAPs from a given (e.g., geospatial location 105).

In some embodiments, the ability for aggregated WAP data 150 to be exposed via a RESTful web service API permits the observation of impact, over a broad timespan, of how a given Wi-Fi environment changes as customer and non-customer access points are added, removed, or changed. In addition, the RESTful API also permits WAP data 150 to be ingested into other cybersecurity systems and services (e.g., as a source of actionable data to trigger security workflows in security orchestration and automation (SOAR) computing systems).

In other embodiments, WAP data 150 collected and processed by collector 120 includes at least (1) Service Set Identifiers (SSIDs) 165(1)-(N) (e.g., a name, that appears in a list of available access points, for a given access point), (2) Basic Service Set Identifiers 170(1)-(N) (e.g., the Media Access Control (MAC) address of an access point), (3) Receive Signal Strength Identifiers (RSSIs) 175(1)-(N) (e.g., a measurement of the power present in a received radio signal from a given access point), (4) channel numbers 180(1)-(N) (e.g., the channel number, within a particular band, that a given access point receives and transmits on), (5) encryption types 185(1)-(N) (e.g., the type of encryption used (if any), for securing web traffic (e.g., none, Wired Equivalent Privacy (WEP), Wi-Fi Protected Access (WPA), WPA2, and the like), and (6) hidden status indicators 190 (1)-(N) (e.g., an indication of whether or not a given access point is hidden—no SSID is displayed for the given access point). In this example, a sensor node constructs a JavaScript Object Notation (JSON)-formatted string that includes at least data points (1)-(6) (e.g., as described above)) for each access point, and returns the string in a Hypertext Transfer Protocol (HTTP) response (e.g., to interrogator 110).

Example Floor Plan at a Geospatial Location

Figure 2A:
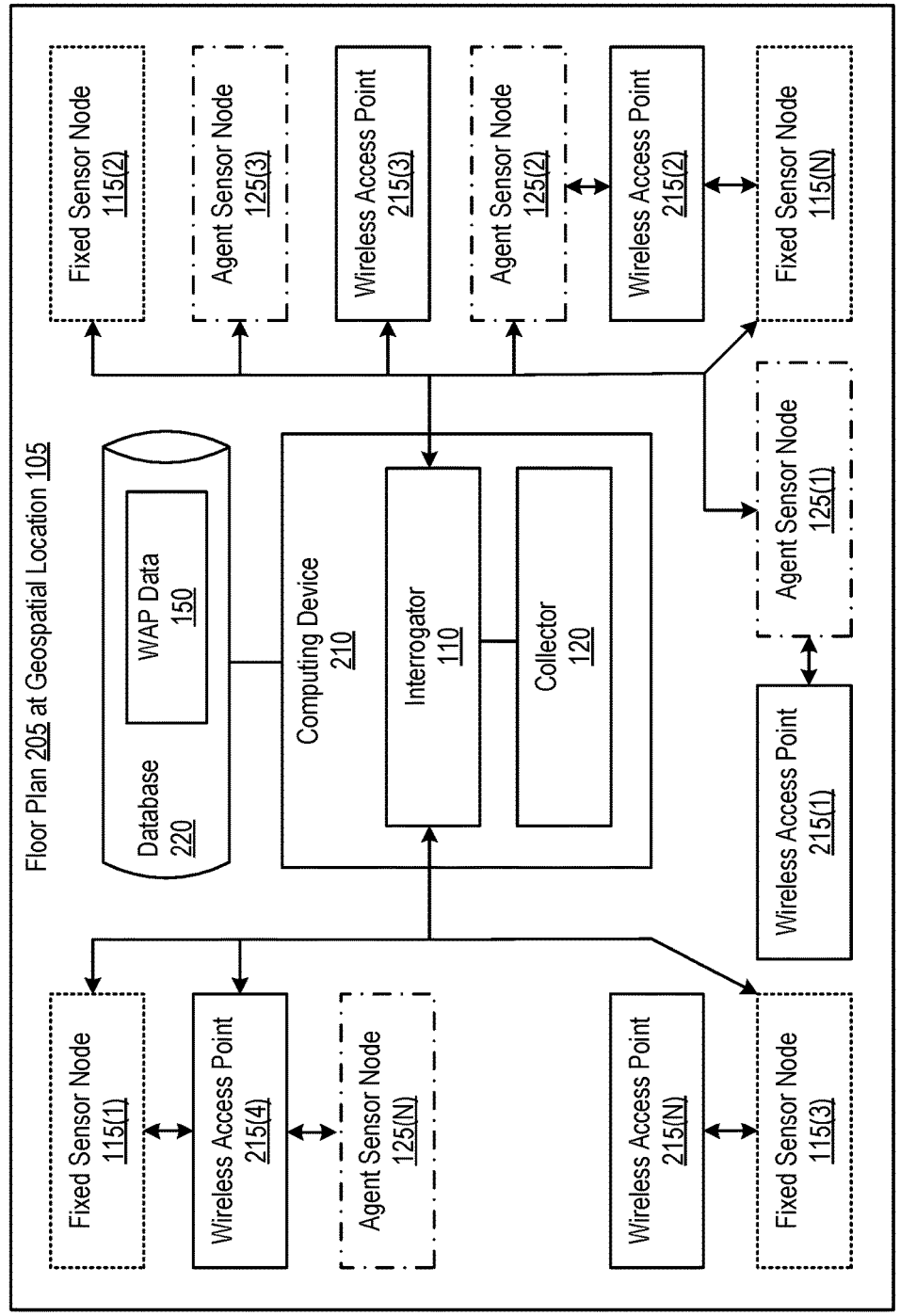
FIG. 2A is a block diagram 200A of a floor plan at a geospatial location, according to one embodiment of the present disclosure.

FIG. 2A is a block diagram 200A of a floor plan at a geospatial location, according to one embodiment. A floor plan 205 at geospatial location 105 includes at least a computing device 210 with interrogator 110 and collector 120 communicatively coupled to a database 220 that stores WAP data 150. Floor plan 205 at geospatial location 105 also includes fixed sensor nodes 115(1)-(N), agent sensor nodes 125(1)-(N), and wireless access points 215(1)-(N).

In one embodiment, computing device 210 receives WAP data 150 associated with wireless access points 215(1)-(N) from fixed sensors nodes 115(1)-(N) and agent sensor nodes 125(1)-(N), performs a wireless site survey at geospatial location 105 based on WAP data 150 (e.g., using floor plan 205 and mapping the RSSI for a given wireless access point as seen by each wireless sensor node), and based on the wireless site survey, determines an approximate location at geospatial location 105 of a rogue wireless access point that is one of wireless access points 215(1)-(N) (e.g., based on trusted WAPs and the wireless site survey). In this example, fixed sensor nodes 115(1)-(N) provide a part of WAP data 150 at a periodic interval and agent sensor nodes 125(1)-(N) provide another part of WAP data 150 at a non-synchronous interval.

In some embodiments, for each wireless access point, WAP data 150 includes at least a SSID, a BSSID, a RSSI, a channel number, an encryption type, and a hidden status. In this example, performing the wireless site survey includes accessing floor plan 205 for geospatial location 105 and mapping the RSSI for a WAP (e.g., WAP 215(4)) as indicated by the fixed sensor node and/or the agent-based sensor node (e.g., fixed sensor node 115(1) and/or agent sensor node 125(N)). In other embodiments, determining the approximate location of the rogue WAP includes accessing a set of trusted WAPs and identifying a WAP (e.g., one of WAPs 215(1)-(N)) that shares an SSID but not a BSSID with the trusted WAPs.

In certain embodiments, the (identified) WAP (e.g., WAP 215(4)) is designated as the rogue WAP and the approximate location of the rogue WAP on floor plan 205 is indicated (e.g., in the NW corner of geospatial location 105). In some embodiments, each WAP 215(1)-(N) is classified into a trusted class for customer managed WAPs, a trusted class for non-customer managed WAPs, an untrusted class for non-customer managed WAPs, a malicious class for the WAP, and a malicious class for all other WAPs using one or more supervised machine learning (ML) techniques and/or methodologies.

Example Wireless Sensor Node

Figure 2B:
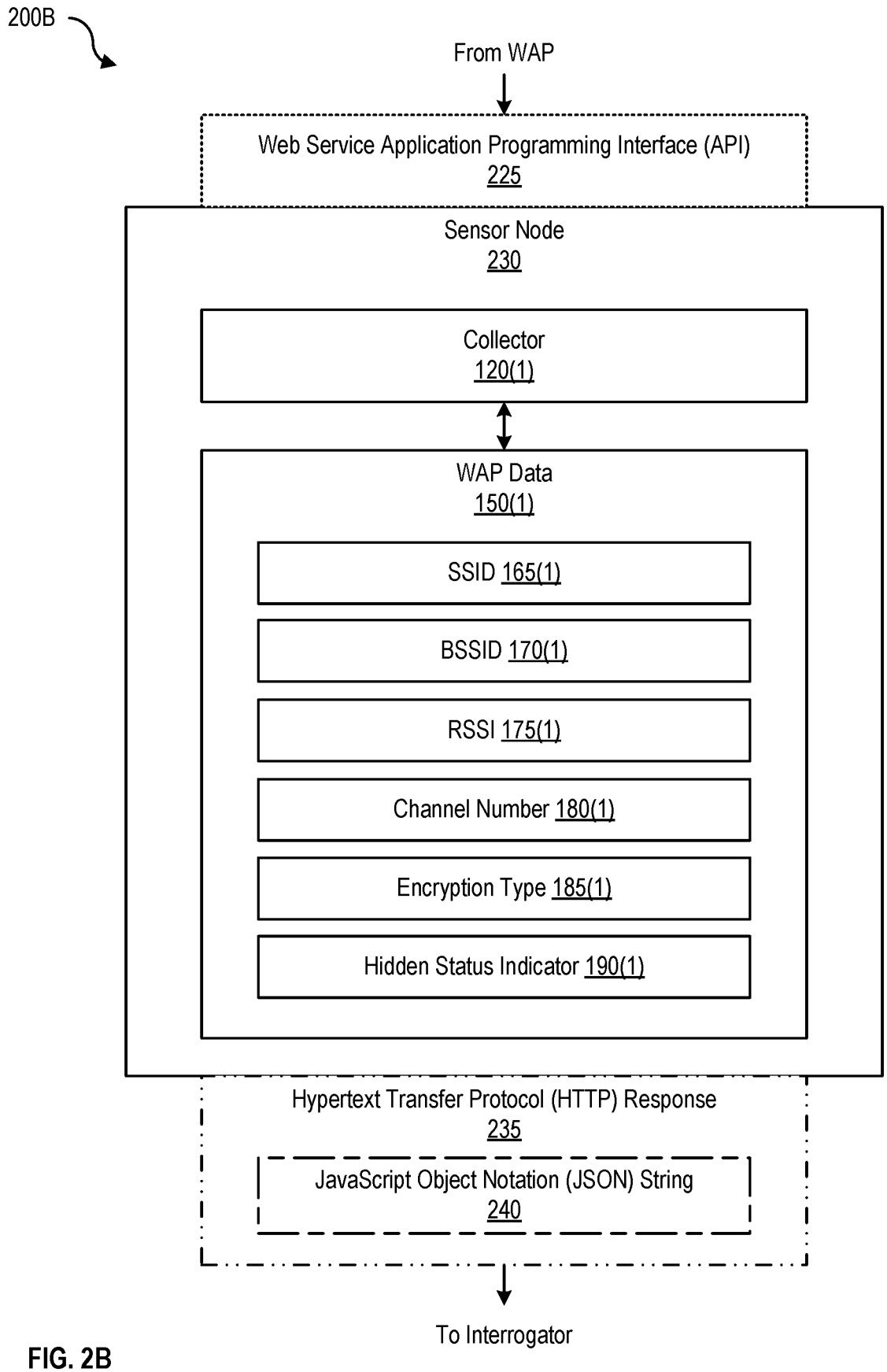
FIG. 2B is a block diagram 200B of a sensor node, according to one embodiment of the present disclosure.

FIG. 2B is a block diagram 200B of a sensor node, according to one embodiment. As shown in FIG. 2B, web service API 225 permits a scan of wireless access points in geospatial location 105. During the scan, and in this example, sensor node 230 (which can be a fixed sensor node or a agent-based sensor node) collects WAP 150(1) associated with a scanned wireless access point that includes, but is not limited to, SSID 165(1), BSSID 170(1), RSSI 175(1), channel number 180(1), encryption type 185(1), and hidden status indicator 190(1). Sensor node 230 then constructs or generates JSON-string 240 that includes the foregoing information (e.g., WAP data 150(1)) and transmits JSON-string 240 to interrogator 110 as part of HTTP response 235.

In this manner, collected WAP data 150 (e.g., amalgamated and aggregated from both fixed sensor nodes (e.g., in a periodic manner) and agent sensor nodes (e.g., in a non-synchronous manner)) from each scan (e.g., SSID, BSSID, RSSI, channel number, encryption type, and hidden status) is then made available, in aggregate, via web service API 225 to perform at least rogue access point detection operations and wireless site survey operations.

Example Incident Detection and Response Server

FIG. 3A is a block diagram 300A of an incident detection and response (IDR) server, according to one embodiment. IDR server 130, which can be any type of physical or virtual computing device, includes at least a wireless site survey engine 305, a rogue wireless access point detector 214, a WAP classification engine 320, and a security operations manager 325. Wireless site survey engine 305 includes floor plan 205 and a map 310. Security operations manager 325 includes a correlation engine 330 and a workflow generator 335.

When deploying a wireless network, it can be desirable to verify adequate coverage of the geospatial areas where users will be physically situated. Therefore, wireless site survey engine 305 performs a wireless site survey operation to modify the location of individual WAPs in order to facilitate optimal coverage. In one embodiment, wireless site survey engine 305 generates map 310 using RSSI measurements/data from each sensor node and their respective locations (retrieved from floor plan 205—as shown in FIG. 2A). In another embodiment, map 310 permits the effectiveness of the coverage area for each WAP in geospatial location 105 to be visualized. Furthermore, other WAPs in the vicinity of geospatial location 105 (e.g., on other networks in the same office building, and the like) can also be accounted for in map 310. In this manner, wireless site survey engine 305 generates map 310 that includes the location of wireless sensor nodes as well as wireless access points operating in geospatial location 105.

In certain embodiments, the location of the wireless sensor nodes is accessed by wireless site survey engine 130 (e.g., from (or using) floor plan 205) to plot one or more wireless sensor nodes on a map of a given geospatial location (e.g., map 310 of geospatial location 105). Map 310 facilitates the navigation of WAP data 150 that is collected by individual wireless sensor nodes. In addition to the location of one or more wireless sensor nodes, interrogator 110 is configured to manage the wireless access points as well as their respective specific details (e.g., SSID, BSSID, channel name, encryption type, hidden status, and the like) that are responsible for providing coverage for the network in geospatial location 105. Using the foregoing WAP data as well as information collected by collector 120 from non-synchronized (and periodic) wireless sensor node scans, rogue wireless access point detector 315 can detect the presence of a WAP that may be masquerading as a legitimate WAP (e.g., a rogue WAP).

Upon detection of a rogue WAP by rogue wireless access point detector 315, security operations manager 325 alerts a user (e.g., a network or security administrator) to the presence (and the approximate location) of the rogue WAP in geospatial location 105. In this manner, rogue WAPs such as illegitimately deployed WiFi Pineapples can be located and disabled. In addition, further security actions can be taken by security operations manager 325 to address risks associated with computing assets and credentials that may have been compromised as a result of inadvertently connecting to the rogue WAP.

In one embodiment, correlation engine 330 correlates the presence and location of the rogue WAP in geospatial location 105 to one or more other computing or process-based activities that may be detected and logged by agents operating on computing assets in geospatial location 105 (e.g., identifying a user that has connected to the rogue WAP and quarantining the user's machine). In another embodiment, workflow generator 335 automatically generates and orchestrates a security workflow that takes remedial security action to limit (or contain) the harm caused by the rogue WAP (e.g., requiring users to reconnect to legitimate WAPs with a different channel name and SSID, and the like).

FIG. 3B is a block diagram 300B of a WAP classification engine, according to one embodiment. Because database 220 maintains WAP 150 that includes the identities of known and/or trusted WAPs, WAP classification engine 320 classifies newly encountered WAPs into one of several categories using supervised machine learning techniques. For example, each detected WAP in geospatial location 105 can be classified as a trusted WAP that is customer managed, a trusted WAP that is non-customer managed, an untrusted WAP that is non-customer managed, a malicious WAP that is a rogue WAP and a malicious WAP that is classified as 'other.' By doing so, rogue wireless access point detector 315 can optimize and speed-up the detection of rogue WAPs in geospatial location 105.

Therefore, the systems and methods disclosed herein perform a wireless site survey operation that maps the location of WAPs based on WAP data collected from these WAPs by fixed sensor nodes in a periodic manner and agent sensor nodes in a non-synchronous manner, detect the presence of a rogue WAP (e.g., same SSID but an unmatched BSSID), and detect and identify the (approximate) location of a rogue WAP in a given geospatial location.

Example Processes to Perform Rogue WAP Detection and Location Identification

Figure 4:
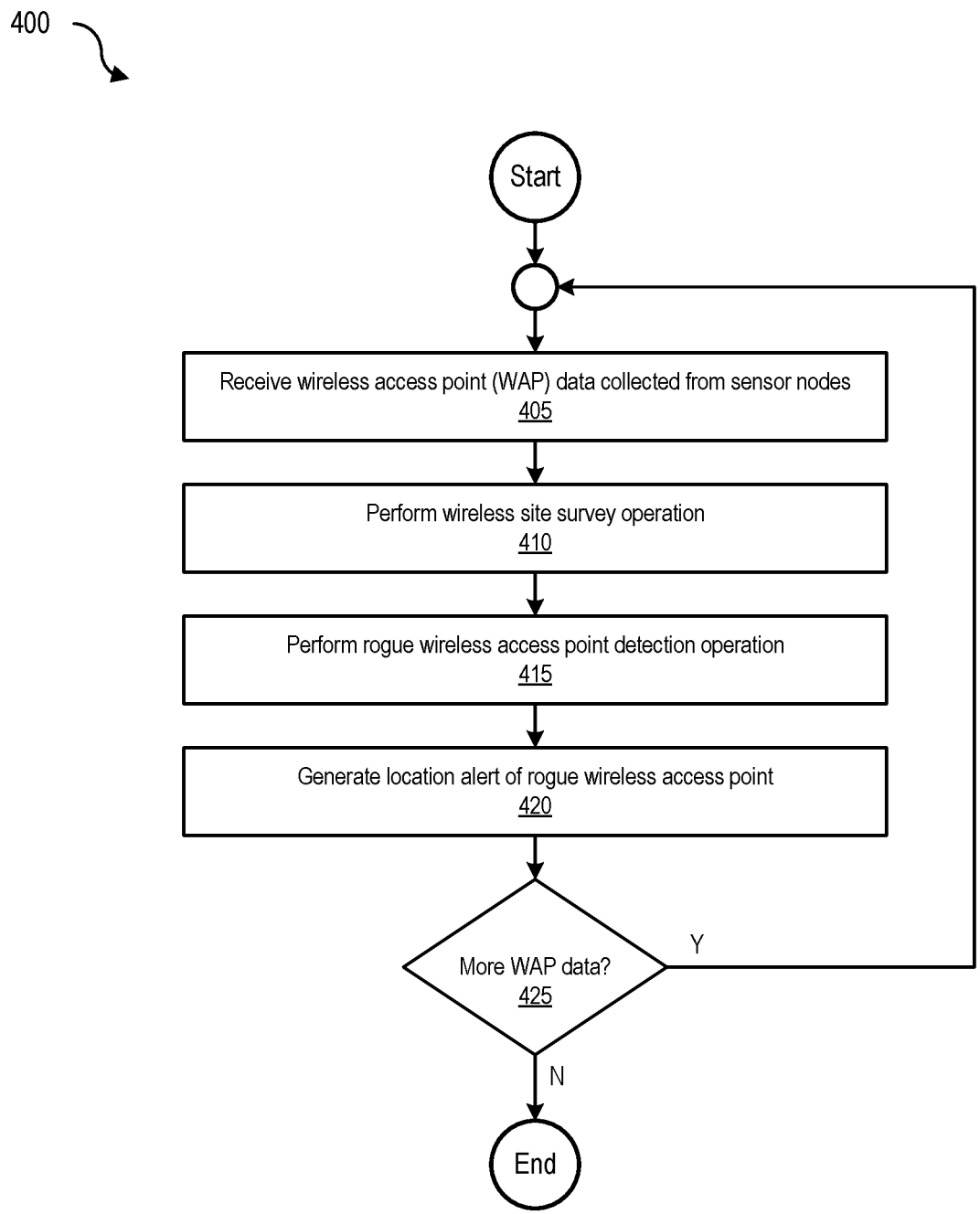
FIG. 4 is a flowchart 400 of a process 400 for performing IDR using WAP data, according to one embodiment of the present disclosure.

FIG. 4 is a flowchart 400 of a process 400 for performing IDR using WAP data, according to one embodiment. The process begins at 405 by receiving wireless access point (WAP) data collected from (wireless) sensor nodes (e.g., in a periodic manner from fixed sensor nodes 115(1)-(N) and in an un-synchronized manner by agent sensor nodes 125(1)-(N)). At 410, the process performs a wireless site survey operation (e.g., by mapping the location of WAPs 215(1)-(N) based on their signal strength on floor plan 205 in geospatial location 105).

At 415, the process performs a rogue WAP detection operation (e.g., based on the wireless site survey and the associated visualization—map 310 as shown in FIG. 3A in addition to BSSID matching as discussed above). For example, if a given WAP has the same SSID as one or more legitimate WAPs in geospatial location 105 but has a BSSID that does not match any of the BSSIDs of the legitimate WAPs, the given WAP is designated as a rogue WAP or an illegitimate WAP. Then, at 420, the process generates a location alert of the rogue WAP (e.g., based on map 310 that is generated based on floor plan 205 and WAP data 150). At 425, the process determines if there is more WAP data (e.g., a newly discovered or scanned WAP in geospatial location 105). If there is more WAP data, the process loops to 405. Otherwise, the process ends.

Figure 5:
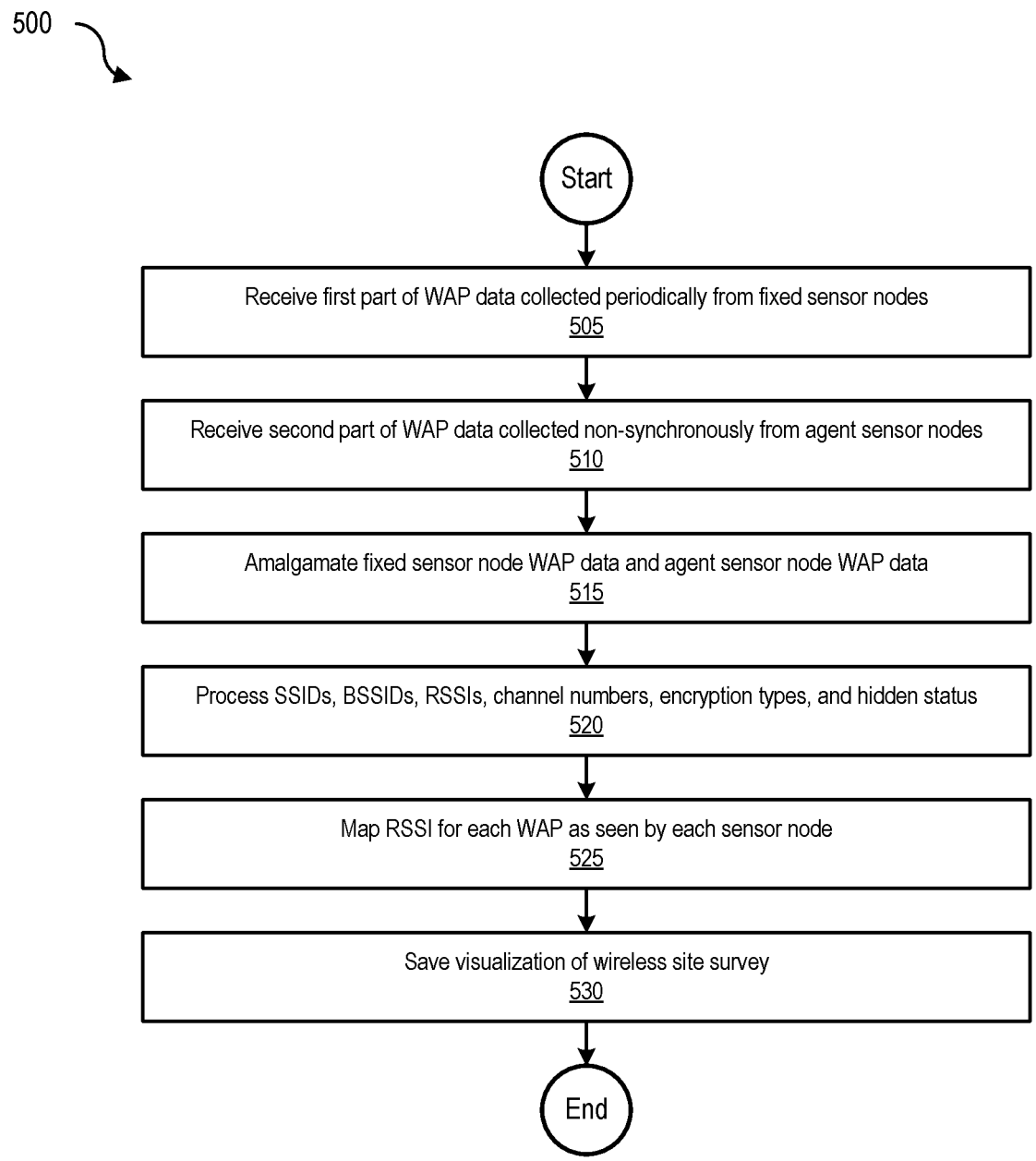
FIG. 5 is a flowchart 500 of a process 500 for performing a wireless site survey, according to one embodiment of the present disclosure.

FIG. 5 is a flowchart 500 of a process 500 for performing a wireless site survey, according to one embodiment. The process begins at 505 by receiving a first part of WAP data 150 collected periodically from fixed sensor nodes 115(1)-(N). At 510, the process receives a second part of WAP data 150 collected non-synchronously from agent sensor nodes 125(1)-(N). At 515, the process amalgamates and/or aggregates the periodically collected WAP data and the non-synchronously collected WAP data.

In one embodiment, collector 120 multiplexes RSSIs from multiple WAPs into a single signal measurement and transmits the multiplexed RSSI signal data measurement to WAP data manager 135 in IDR server 130. WAP data manager 135 then demultiplexes the multiplexed RSSI data (from multiple WAPs) into separate signal strength indicators, which, when matched with the received SSIDs, indicates the individual signal strengths of the multiple WAPs in geospatial location 105. In this manner, the system of FIG. 1A optimizes and speeds-up the detection of rogue WAPs—thus minimizing the time the rogue WAP has to act surreptitiously.

At 520, the process processes SSIDs, BSSIDs, RSSIs, channel numbers, encryption types, and hidden status (indicators) (e.g., to generate WAP data 150 by WAP data manager 135 as shown in FIG. 1A). In one embodiment, because RSSI measurements are signal strength indicators and are collected (or measured) by wireless sensor nodes (which are physical devices), RSSIs from various WAPs can be multiplexed for efficient transmission to IDR server 130 for speedy processing. In this example, the demultiplexed RSSI data on IDR server 130 can be used to determine a variation between previously demultiplexed data (e.g., based on a set of trusted WAPs) and newly multiplexed data (thus permitting optimized identification of newly-discovered WAPs and (and by) their associated RSSI measurement).

At 525, the process maps the RSSI for each WAP as seen by each sensor node (e.g., by generating map 310 using floor plan 205 for rogue WAP location determination (or an approximate location determination) in geospatial location 105), and ends at 530 by saving a visualization of the wireless site survey (e.g., as map 310). The visualization of the wireless site survey permits rogue WAP detector 315 to calculate and determine an approximate location of a rogue WAP in geospatial location 105 and present (this) approximate location of the rogue WAP in an alert notification (e.g., to a security analyst in a security operations center (SOC) for removal or disablement of the illegitimate WAP).

Figure 6:
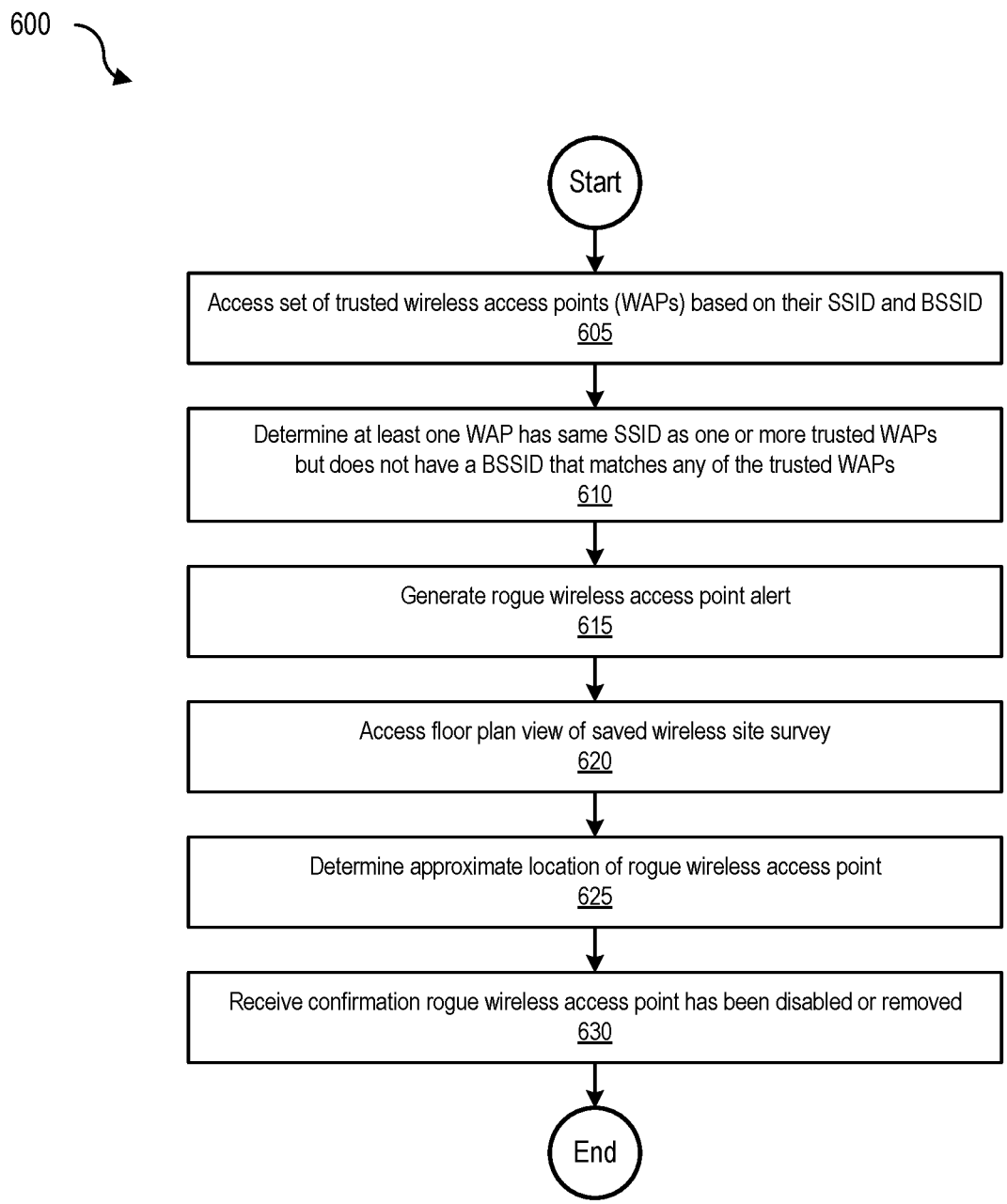
FIG. 6 is a flowchart 600 of a process 600 for performing rogue WAP detection, according to one embodiment of the present disclosure.

FIG. 6 is a flowchart 600 of a process 600 for performing rogue WAP detection, according to one embodiment. The process begins at 605 by accessing a set of trusted WAPs based on their SSID and BSSID, and at 610, determines that at least one WAP has the same SSID as one or more trusted WAPs but does not have a BSSID that matches any of the trusted WAPs. At 615, the process generates a rogue WAP alert (e.g., that a rogue WAP has been detected in the premises of geospatial location 105).

At 620, the process accesses a floor plan view of the saved wireless site survey (e.g., view of floor plan 205 saved as map 310 after performance of the wireless site survey operation). At 625, the process determines an approximate location of the rogue wireless access point (e.g., based on map 310 and the SSID (match)/BSSID (no match) comparison process described above). The process ends at 630 by receiving confirmation that the rogue WAP has been disabled or removed (e.g., upon performance of an automated and orchestrated security workflow).

Figure 7:
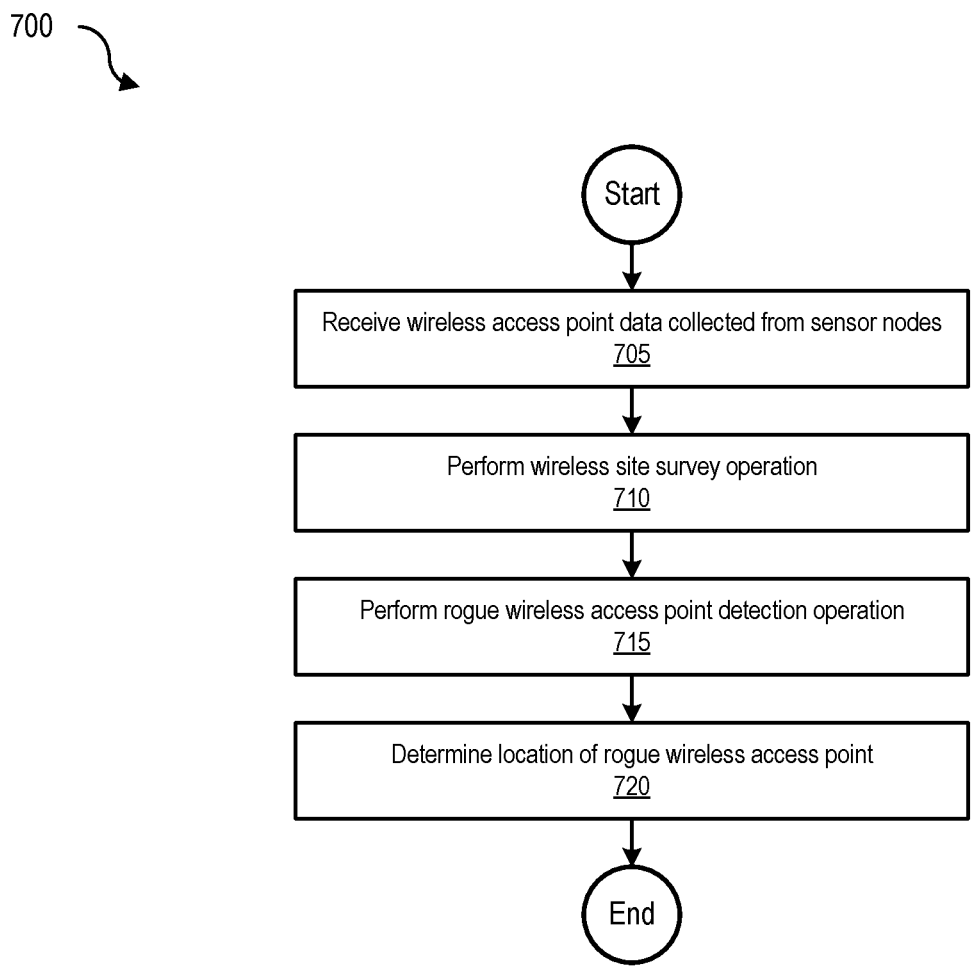
FIG. 7 is a flowchart 700 of a process 700 for determining the location of a rogue WAP, according to one embodiment of the present disclosure.

FIG. 7 is a flowchart 700 of a process 700 for determining the location of a rogue WAP, according to one embodiment. The process beings at 705 by receiving WAP data collected from sensor nodes (e.g., WAP data associated with wireless access points from fixed sensor nodes and agent-based sensor nodes). At 710, the process performs a wireless site survey operation (e.g., based on the WAP data). At 715, the process performs a rogue wireless access point detection operation (e.g., based on the wireless site survey). The process ends at 720 by determining the location of the rogue WAP (e.g., in geospatial location 105).

Therefore, the methods, systems, and processes disclosed herein perform incident detection and response (IDR) using WAP data by identifying and locating rogue WAPs (e.g., for deactivation and/or removal) in modern networked computing environments.

Example Computing Environment

Figure 8:
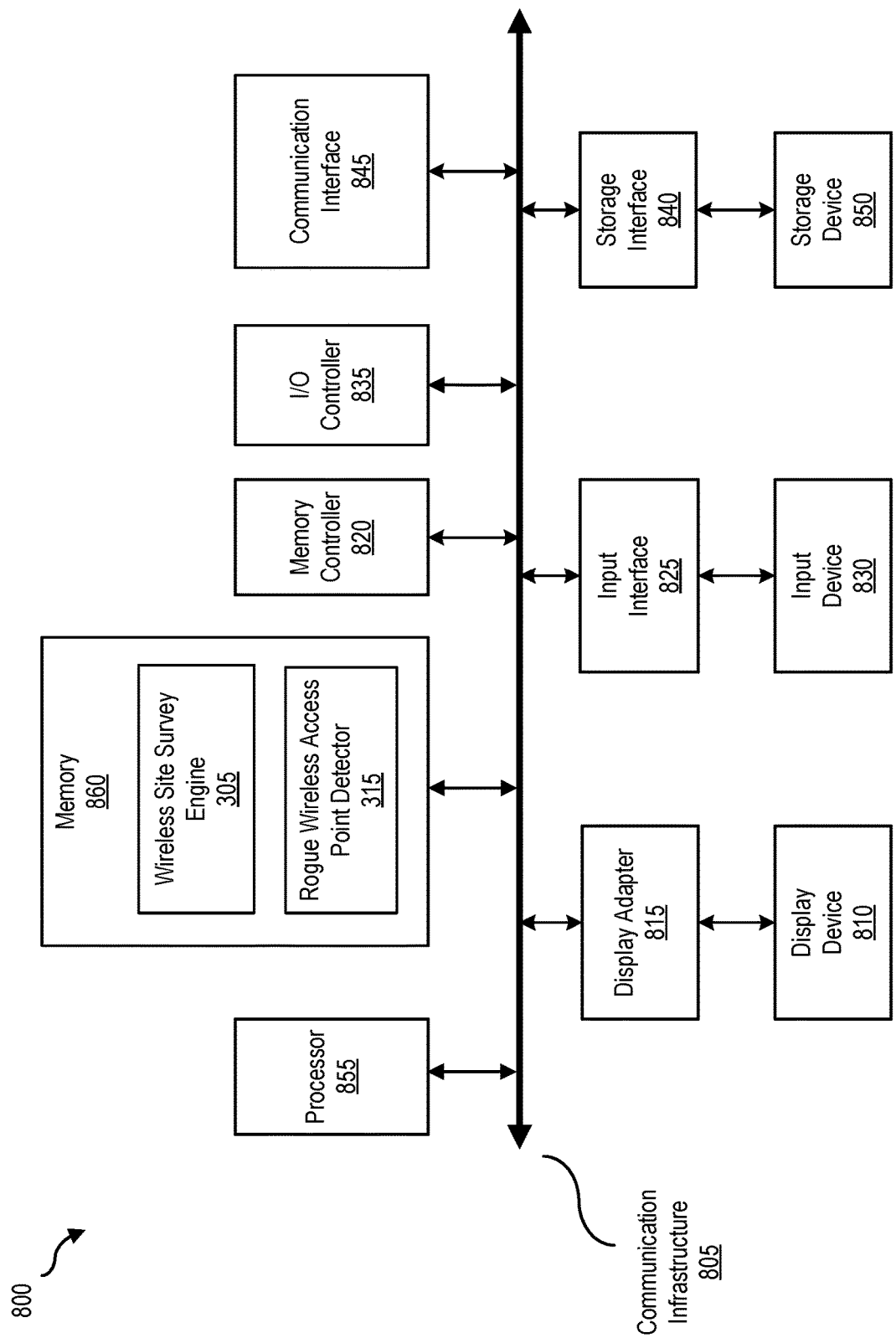
FIG. 8 is a block diagram 800 of a computing system, illustrating a wireless site survey engine and a rogue WAP detector implemented in software, according to one embodiment of the present disclosure.

FIG. 8 is a block diagram 800 of a computing system, illustrating a wireless site survey engine and/or a rogue WAP detector implemented in software, according to one embodiment. Computing system 800 can include IDR server 130, interrogator 110, or collector 120 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices, network appliances, storage controllers, and the like. In its most basic configuration, computing system 800 may include at least one processor 855 and a memory 860. By executing the software that executes wireless site survey engine 305 and/or rogue WAP detector 315, computing system 800 becomes a special purpose computing device that is configured to detect rogue WAPs and determine their (approximate) location in a given geospatial location.

Processor 855 generally represents any type or form of processing unit capable of processing data or interpreting and executing instructions. In certain embodiments, processor 855 may receive instructions from a software application or module that may cause processor 855 to perform the functions of one or more of the embodiments described and/or illustrated herein. Memory 860 generally represents any type or form of volatile or non-volatile storage devices or mediums capable of storing data and/or other computer-readable instructions. Examples include, random access memory (RAM), read only memory (ROM), flash memory, or any other suitable memory device. In one example, program instructions implementing wireless site survey engine 305 and/or rogue WAP detector 315 may be loaded into memory 860.

In certain embodiments, computing system 800 may also include one or more components or elements in addition to processor 855 and/or memory 860. For example, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805, and may perform and/or be a means for performing, either alone or in combination with other elements, one or more of the operations or features described and/or illustrated herein. I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type/form of communication device/adapter capable of facilitating communication between computing system 800 and other devices and may facilitate communication between computing system 800 and a private or public network. Examples of communication interface 845 include, a wired network interface (e.g., network interface card), a wireless network interface (e.g., a wireless network interface card), a modem, and any other suitable interface. Communication interface 845 may provide a direct connection to a remote server via a direct link to a network, such as the Internet, and may also indirectly provide such a connection through, for example, a local area network. Communication interface 845 may also represent a host adapter configured to facilitate communication between computing system 800 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 800 may also include at least one display device 810 coupled to communication infrastructure 805 via a display adapter 815 that generally represents any type or form of device capable of visually displaying information forwarded by display adapter 815. Display adapter 815 generally represents any type or form of device configured to forward graphics, text, and other data from communication infrastructure 805 for display on display device 810. Computing system 800 may also include at least one input device 830 coupled to communication infrastructure 805 via an input interface 825. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. Storage device 850 may be configured to read and write software, data, or other computer-readable information. Storage device 850 may be a part of computing system 800 or may be a separate device accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850. When executed by processor 855, a computer program loaded into computing system 800 may cause processor 855 to perform and/or be a means for performing the functions of one or more of the embodiments described/illustrated herein. Alternatively, one or more of the embodiments described and/or illustrated herein may be implemented in firmware and/or hardware.

Example Networking Environment

Figure 9:
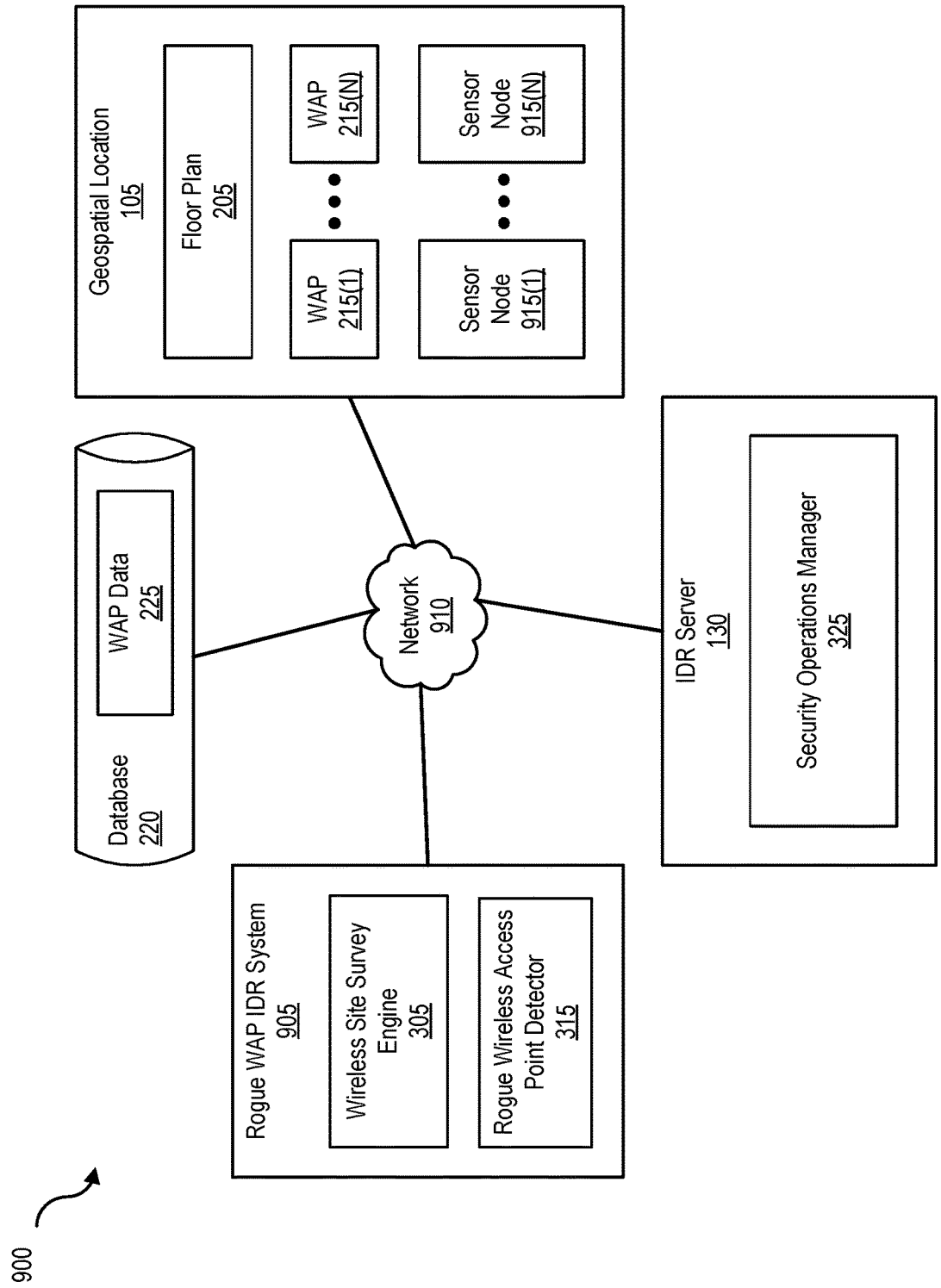
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. Network 910 generally represents any type or form of computer network or architecture capable of facilitating communication between interrogator 110, collector 120, IDR server 130, and/or rogue WAP IDR system 905. For example, network 910 can be a Wide Area Network (WAN) (e.g., the Internet) or a Local Area Network (LAN) implemented in (or for) geospatial location 105. In certain embodiments, a communication interface, such as communication interface 845 in FIG. 8, may be used to provide connectivity between interrogator 110, collector 120, IDR server 130, and/or rogue WAP IDR system 905, and network 910.

Wireless site survey engine 305 and rogue WAP detector 315 may be part of IDR server 130, or may be separate. If separate, wireless site survey engine 305 and/or rogue WAP detector 315 and IDR server 130 may be communicatively coupled via network 910. All or a portion of embodiments may be encoded as a computer program and loaded onto and executed by interrogator 110, collector 120, IDR server 130, and/or rogue WAP IDR system 905, and may be stored on interrogator 110, collector 120, IDR server 130, and/or rogue WAP IDR system 905, and distributed over network 910.

In some examples, all or a portion of interrogator 110, collector 120, DR server 130, and/or rogue WAP IDR system 905 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. The embodiments described and/or illustrated herein are not limited to the Internet or any particular network-based environment.

Various functions described herein may be provided through a remote desktop environment or any other cloud-based computing environment. In addition, one or more of the components described herein may transform data, physical devices, and/or representations of physical devices from one form to another. For example, wireless site survey engine 305 and/or rogue WAP detector 315 may transform the behavior of interrogator 110, collector 120, IDR server 130, and/or rogue WAP IDR system 90 to detect rogue WAPs and determine their (approximate) location in a given geospatial location.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
receiving wireless access point (WAP) data associated with wireless access points from fixed sensor nodes that provide a first part of the WAP data at a periodic interval and agent-based sensor nodes that provide a second part of the WAP data at a non-synchronized interval, wherein
the WAP data comprises a Service Set Identifier (SSID), a Basic Service Set Identifier (BSSID), and a Receive Signal Strength Indicator (RSSI) for each wireless access point;
performing a wireless site survey at a geospatial location based on the WAP data, wherein
the agent-based sensor nodes are mobile within the geospatial location to improve spatial resolution by filling one or more coverage gaps missed by the fixed sensor nodes as part of the wireless site survey; and
based on the wireless site survey:
generating a visualization indicating a coverage area of each of the wireless access points in the geospatial location, and
generating an alert indicating an approximate location at the geospatial location, of a rogue wireless access point that is one of the wireless access points.

2. The computer-implemented method of claim 1, wherein for each wireless access point, the WAP data further comprises at least a channel number, an encryption type, and a hidden status.

3. The computer-implemented method of claim 2, wherein performing the wireless site survey comprises:
accessing a floor plan for the geospatial location, and
mapping the RSSI for a wireless access point as indicated by one or more fixed sensor nodes and one or more agent-based sensor nodes.

4. The computer-implemented method of claim 3, wherein determining the approximate location of the rogue wireless access point comprises:
accessing a set of trusted wireless access points, and
identifying a wireless access point that shares an SSID but not a BSSID with one or more of the trusted wireless access points.

5. The computer-implemented method of claim 4, further comprising:
designating the wireless access point as the rogue wireless access point; and
indicating the approximate location of the rogue wireless access point on the floor plan.

6. The computer-implemented method of claim 2, further comprising:
classifying the each wireless access point into one of the following classes: a trusted class for customer managed wireless access points, a trusted class for non-customer managed wireless access points, an untrusted class for non-customer managed wireless access points, a malicious class for the wireless access point, and a malicious class for all other wireless access points.

7. A non-transitory computer readable storage medium comprising program instructions executable to:

receive wireless access point (WAP) data associated with wireless access points from fixed sensor nodes that provide a first part of the WAP data at a periodic interval and agent-based sensor nodes that provide a second part of the WAP data at a non-synchronized interval, wherein
the WAP data comprises a Service Set Identifier (SSID), a Basic Service Set Identifier (BSSID), and a Receive Signal Strength Indicator (RSSI) for each wireless access point;
perform a wireless site survey at a geospatial location based on the WAP data, wherein
the agent-based sensor nodes are mobile within the geospatial location to improve spatial resolution by filling one or more coverage gaps missed by the fixed sensor nodes as part of the wireless site survey; and
based on the wireless site survey:
generate a visualization indicating a coverage area of each of the wireless access points in the geospatial location, and
generate an alert indicating an approximate location at the geospatial location, of a rogue wireless access point that is one of the wireless access points.

8. The non-transitory computer readable storage medium of claim 7, wherein
for each wireless access point, the WAP data further comprises at least a channel number, an encryption type, and a hidden status.

9. The non-transitory computer readable storage medium of claim 8, wherein
performing the wireless site survey comprises:
accessing a floor plan for the geospatial location, and
mapping the RSSI for a wireless access point as indicated by one or more fixed sensor nodes and one or more agent-based sensor nodes.

10. The non-transitory computer readable storage medium of claim 9, wherein
determining the approximate location of the rogue wireless access point comprises:
accessing a set of trusted wireless access points, and
identifying a wireless access point that shares an SSID but not a BSSID with one or more of the trusted wireless access points.

11. The non-transitory computer readable storage medium of claim 10, further comprising:
designating the wireless access point as the rogue wireless access point; and
indicating the approximate location of the rogue wireless access point on the floor plan.

12. The non-transitory computer readable storage medium of claim 8, further comprising:
classifying the each wireless access point into one of the following classes: a trusted class for customer managed wireless access points, a trusted class for non-customer managed wireless access points, an untrusted class for non-customer managed wireless access points, a malicious class for the wireless access point, and a malicious class for all other wireless access points.

13. A system comprising:
one or more processors; and
a memory coupled to the one or more processors, wherein the memory stores program instructions executable by the one or more processors to:
receive wireless access point (WAP) data associated with wireless access points from fixed sensor nodes that provide a first part of the WAP data at a periodic interval and agent-based sensor nodes that provide a second part of the WAP data at a non-synchronized interval, wherein
the WAP data comprises a Service Set Identifier (SSID), a Basic Service Set Identifier (BSSID), and a Receive Signal Strength Indicator (RSSI) for each wireless access point;
perform a wireless site survey at a geospatial location based on the WAP data, wherein the agent-based sensor nodes are mobile within the geospatial location to improve spatial resolution by filling one or more coverage gaps missed by the fixed sensor nodes as part of the wireless site survey; and
based on the wireless site survey:
generate a visualization indicating a coverage area of each of the wireless access points in the geospatial location, and
generate an alert indicating an approximate location at the geospatial location, of a rogue wireless access point that is one of the wireless access points.

14. The system of claim 13, wherein
for each wireless access point, the WAP data further comprises at least a Service Set Identifier (SSID), a Basic Service Set Identifier (BSSID), a Receive Signal Strength Indicator (RSSI), a channel number, an encryption type, and a hidden status.

15. The system of claim 14, wherein
performing the wireless site survey comprises:
accessing a floor plan for the geospatial location, and mapping the RSSI for a wireless access point as indicated by one or more fixed sensor nodes and one or more agent-based sensor nodes.

16. The system of claim 15, wherein
determining the approximate location of the rogue wireless access point comprises:
accessing a set of trusted wireless access points, and
identifying a wireless access point that shares an SSID but not a BSSID with one or more of the trusted wireless access points.

17. The system of claim 16, further comprising:
designating the wireless access point as the rogue wireless access point; and
indicating the approximate location of the rogue wireless access point on the floor plan.

18. The system of claim 13, further comprising:
classifying the each wireless access point into one of the following classes: a trusted class for customer managed wireless access points, a trusted class for non-customer managed wireless access points, an untrusted class for non-customer managed wireless access points, a malicious class for the wireless access point, and a malicious class for all other wireless access points.

* * * * *